(12) United States Patent
Schirnhofer et al.

(10) Patent No.: US 10,934,490 B2
(45) Date of Patent: Mar. 2, 2021

(54) PROCESS FOR PRODUCING BIOCOAL AND PLANT THEREFOR

(71) Applicant: Leo Schirnhofer, Weissenbach (AT)

(72) Inventors: Leo Schirnhofer, Weissenbach (AT); Holger Knautz, Leobersdorf (AT)

(73) Assignee: Leo Schirnhofer, Weissenbach (AT)

( * ) Notice: Subject to any disclaimer, the term of this patent is extended or adjusted under 35 U.S.C. 154(b) by 77 days.

(21) Appl. No.: 16/336,769

(22) PCT Filed: Sep. 20, 2017

(86) PCT No.: PCT/EP2017/073824
§ 371 (c)(1),
(2) Date: Mar. 26, 2019

(87) PCT Pub. No.: WO2018/055003
PCT Pub. Date: Mar. 29, 2018

(65) Prior Publication Data
US 2020/0270528 A1    Aug. 27, 2020

(30) Foreign Application Priority Data

Sep. 26, 2016  (AT) .................................. A 438/2016

(51) Int. Cl.
| C10B 47/02 | (2006.01) |
| C10B 47/16 | (2006.01) |
| C10B 47/06 | (2006.01) |
| C10B 53/02 | (2006.01) |

(52) U.S. Cl.
CPC .............. *C10B 47/16* (2013.01); *C10B 47/06* (2013.01); *C10B 53/02* (2013.01)

(58) Field of Classification Search
CPC .......... C10B 47/06; C10B 47/16; C10B 53/02
See application file for complete search history.

(56) References Cited

U.S. PATENT DOCUMENTS

| 5,725,738 A | 3/1998 | Brioni et al. |
| 8,226,798 B2 * | 7/2012 | van Aardt ............... C10B 57/10 |
| | | 201/3 |

(Continued)

FOREIGN PATENT DOCUMENTS

| CN | 237758 A | 5/1945 |
| CN | 201284301 Y | 8/2009 |
| DE | 10 2014 015815 A1 | 4/2016 |

OTHER PUBLICATIONS

International Search Report, dated Nov. 28, 2017, from corresponding PCT application No. PCT/EP2017/073824.

(Continued)

*Primary Examiner* — Jonathan Miller
(74) *Attorney, Agent, or Firm* — Nixon & Vanderhye (57) ABSTRACT

Disclosed is a process and plant for producing biocoal in which biogenous starting material located in retorts is pyrolyzed and the flammable pyrolysis gases formed by the pyrolyses are burned to generate hot flue gases. The retorts are introduced consecutively into at least one reactor chamber and by use of the flue gases the pyrolyses are performed therein. The retorts are at least largely closed toward entry of hot flue gases and the heating of the starting materials located in the retorts by the flue gasses is effected only indirectly via the heating of the retorts.

19 Claims, 3 Drawing Sheets

(56) References Cited

U.S. PATENT DOCUMENTS

| | | | |
|---|---|---|---|
| 2006/0163053 A1* | 7/2006 | Ershag | C10B 51/00 201/13 |
| 2012/0137576 A1* | 6/2012 | Lucio | C10B 39/06 44/606 |
| 2012/0308441 A1* | 12/2012 | Hansen | C10B 47/44 422/187 |
| 2013/0011803 A1* | 1/2013 | Siemons | F23G 7/068 432/9 |

OTHER PUBLICATIONS

Office Action issued in Chinese Patent Application No. 201780059240.0 dated Sep. 1, 2020 with English translation provided.

* cited by examiner

PROCESS FOR PRODUCING BIOCOAL AND PLANT THEREFOR

The present invention relates to a process and plant for producing biochar in which biogenous source material contained in retorts is pyrolyzed and the combustible pyrolysis gases formed by the pyrolysis processes are burned in order to generate hot flue gases, wherein the retorts are introduced consecutively into reactor chambers and the pyrolysis processes are performed by means of the flue gases.

Pyrolysis is a thermal conversion process in which organic source materials are used to produce pyrolysis gases and biochars without oxygen. The temperatures at which the source materials pyrolyze lie between 250° C. and 900° C. The duration of a pyrolysis process is between a few minutes and a few hours.

Biochars, which are produced from forestry and agricultural products, in particular wood, are used as charcoal, as soil conditioners, as substrates for manure, as additives for composting, as feed additives, as food supplements, as a raw material in the pharmaceutical industry, and as a raw material for technical purposes, e.g. for filtering air, water, and the like. Particularly for the use of biochar as an industrial raw material, production requires high degrees of quality and a certification of the individual batches.

Through modern technical processes, biogenous source materials with a water content of up to 50% by weight of the fresh substance can be pyrolyzed into high quality biochar. In these processes, the pyrolysis gases produced by the pyrolysis processes are burned. A part of the heat generated in the process is used to dry and heat the subsequently supplied biogenous source materials and to assist the pyrolysis. The far greater portion of the heat is used for heating purposes or, in cogeneration systems, is used for the combined production of electricity and heat.

It is known to produce biochar by means of a continuously running pyrolysis process in which the biogenous source materials are continuously acted on with flue gases in a screw reactor. In such a process, the pyrolysis of the source materials takes place at temperatures of 500° C. to 700° C. and with a dwell time in the range of 15 to 45 minutes. The pyrolysis gases that are generated in the course of this are then cleaned in a dust separator, for example, and then burned. The hot flue gases generated by this are used on the one hand to heat the reactor and on the other, for energy generation by means of a heat exchanger.

In this process, however, due to the continuous material throughput and the intense movements of material passing through the reactor, powerful dust emissions occur, which must be separated out before or after the burning of the pyrolysis gases. In addition, this process involves strict requirements with regard to the granulation size and water content of the source materials. In addition, due to the continuous operating method, only an insufficient tracking of production conditions is possible.

It is also known to place biogenous source materials in batches into retorts, which are individually acted on with flue gases in order to initiate and assist the pyrolysis process. As a result of this, a pyrolysis takes place in the individual batches, the course of which can be controlled by means of the hot flue gases, thus permitting a control of the quality of the individual batches of the biochar produced. But this process, too, has the disadvantage of the flue gases being encumbered with pollutants in the form of gaseous and particulate emissions that are taken up by the flue gases. This known process also suffers from the disadvantage of discontinuity since the supply of the source materials, the supply of the hot flue gases, the removal of the cooled flue gases, and the removal of the biochar produced take place in a discontinuous fashion.

Further developments of retort processes use the pyrolysis gases produced for covering the energy requirement. In these processes as well, the source materials must meet defined basic conditions with regard to the granulation size and water content, which is why complicated preparation steps are required for breaking down and drying materials. In addition, the pyrolysis gases exiting from the retorts usually have to be cooled before they are burned in order to separate out distillation products since only then can the pyrolysis gases be burned and used for heating the reactor. These additional process steps increase the complexity of the plants and often result in contaminated effluents.

WO 2010/132970 A1 has disclosed a pyrolysis process in which individual retorts are placed in a pyrolysis chamber; the source materials contained in the retorts consecutively undergo a drying, a heating, and the pyrolysis as well as the cooling of the resulting char in the pyrolysis chamber, whereupon the retorts are removed from the pyrolysis chamber. According to this process as well, the pyrolysis takes place at a temperature of 320° C. to 350° C. and during the drying and heating as well as during the pyrolysis, the source materials are acted on with hot flue gases from the pyrolysis gas combustion. In order to enable a continuous operation, at least three reactor chambers that are independent of one another are provided, with the drying, the pyrolysis, and the cooling each taking place in a respective reactor chamber.

The pyrolysis gases produced are burned in a burner and the flue gases that are produced are used in direct contact with the source materials for the drying and for the pyrolysis. Furthermore, an addition of the pyrolysis gases exiting from the drying achieves a temperature adjustment. The pyrolysis gases that are not needed for the drying are conveyed out via a smoke stack.

This process is thus disadvantageous since components of the source materials and the resulting char get into the flue gases and then must be filtered out. Since the cooling of the char also takes place in the reactor chambers, this results in the occurrence of significant heat losses. In addition, since the cooling of the char is achieved by injecting water, no heat recovery is possible.

The object of the present invention is to create a process and plant for performing a pyrolysis process, which avoids the disadvantages connected with the known prior art for the production of biochar. This is attained according to the invention in that the retorts are sealed at least to a large extent to prevent the entry of hot flue gases and the heating of the source materials contained in the retorts takes place only indirectly by means of the flue gases through the heating of the retorts.

This ensures that no components of the source materials that are in different stages of char formation get into the flue gases, thus eliminating the need for the cleaning processes for the cooled flue gases would otherwise be required and also insuring that no oxidation of the source materials takes place, which would necessarily result in a production loss.

In comparison to the known pyrolysis processes, this produces a direct connection of the reactor chambers to at least one pyrolysis gas burner and the pyrolysis gases produced are burned immediately and the resulting hot flue gases are continuously used to heat the reaction chambers. Since a plant includes a plurality of retorts, a continuous flow of pyrolysis gases is achieved. In addition, the heating of the retorts and of the pyrolysis gases produced by the pyrolysis processes takes place indirectly without the hot flue gas coming into contact with the source material for producing the biochar and pyrolysis gases.

Preferably, the hot flue gases flowing into a reactor chamber and the cooled flue gases flowing out of it respectively, and the pyrolysis gases that are produced by the pyrolysis processes and flow out of the reactor chamber are kept in regions that are separated from each other by means of a separating wall provided therein. The retorts in this case can be placed in at least one reactor chamber, the pyrolysis gases can be conveyed through an annular space surrounding the respective retorts and to a combustion chamber in which the flue gases are generated, which are conveyed into the at least one reactor chamber in which the flue gases heat the exiting pyrolysis gases and also heat the outer wall of the retort. In addition, part of the flue gases can be conveyed into at least one reactor chamber and part can be conveyed to at least one heat exchanger.

Preferably, the currents of flue gases in the supply lines of the flue gases to the at least one reactor chamber and/or in the outlet lines of the cooled flue gases from the at least one reactor chamber are controlled by means of regulating devices. In addition, the cooled flue gases flowing out of the at least one reactor chamber are partially supplied to the flue gases that are generated in the combustion chamber and that flow to the at least one reactor chamber, thus controlling the temperature of the pyrolysis processes taking place in the retorts.

In addition, cooled flue gases flowing out of the at least one reactor chamber can be supplied to at least one heat exchanger for recovery of residual heat. In particular, residual heat recovered by means of the at least one heat exchanger can be used for drying and/or for preheating the biogenous source materials. In addition, the thermal energy recovered in a cooling of the biochar can be supplied for another use.

Preferably, the individual retorts are consecutively introduced into the at least one reactor chamber and the biogenous source materials contained in the retorts is consecutively pyrolyzed, thus continuously generating pyrolysis gases, by means of which flue gases are produced, which are used to assist and/or control the pyrolysis processes taking place in the retorts. In this case, preferably a first retort in which the pyrolysis has been completed is removed from a reactor chamber and the biochar contained in this retort is removed from the retort, in that the at least one second retort that is contained in a reactor chamber, the source material contained therein is pyrolyzed, and in that at least one third retort is introduced into a reactor chamber and the pyrolysis of the biogenous source material contained therein is initiated.

Preferably, in a plant for carrying out this process, at least one reactor chamber is provided, which is embodied with a reactor space for accommodating at least one retort, with an inlet opening for flue gases into the reactor space, and with an outlet opening for the cooled flue gases, with a separating wall between the retort and the inlet opening and the outlet opening for the flue gases respectively, and also with a line, which is connected to the annular space situated between the retort and the separating wall and in which the pyrolysis gases exiting from the retort are conveyed to the combustion chamber.

In this case, the at least one reactor chamber can be embodied with an at least virtually gastight cover. In addition, a top wall of the at least one reactor chamber can be provided with an opening through which a retort can be inserted into the reactor chamber and in that the retort can be embodied with a laterally protruding flange, which rests against the rim of the opening. As a result, the reactor space of the at least one reactor chamber can be closed in a virtually gastight fashion by means of a retort that is inserted into it.

In addition, in the line for the flue gases leading from the combustion chamber to the at least one reactor chamber a mixing device can be provided, which is able to mix the flue gases flowing from the combustion chamber to the at least one reactor chamber with cooled flue gases, by which the pyrolysis processes taking place in the retorts can be controlled. In addition, in the lines in which the flue gases flow from the combustion chamber to the at least one reactor chamber and/or in the lines in which the cooled flue gases flow out of the at least one reactor chamber, devices can be provided for controlling the flue gases flowing in these lines.

Preferably, the line for the flue gases flowing out of the combustion chamber is connected to at least one heat exchanger in order to use the thermal energy, the at least one heat exchanger is connected to units for drying and/or heating the biogenous source materials. In addition, at least one unit for cooling the biochar produced is provided, whose thermal discharge can be supplied for another use.

The process according to the invention and the plant according to the invention will be explained in greater detail below based on two exemplary embodiments shown in the drawings. In the drawings.

Figure 1:
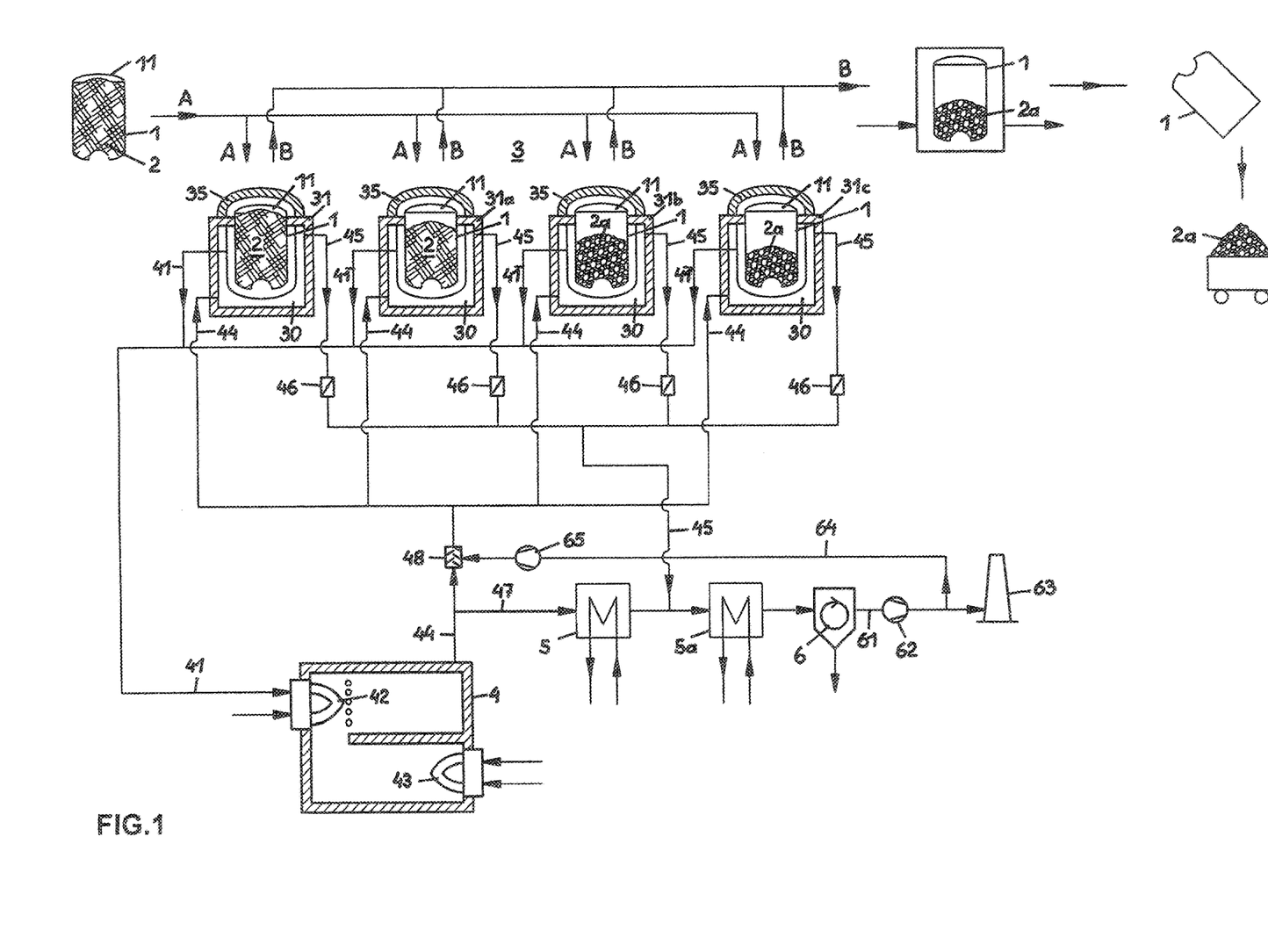
FIG. 1 schematically depicts a first embodiment of a plant for carrying out the process according to the invention

FIG. 1 shows a plant in which retorts 1 that contain a biogenous source material 2 are used to produce biochar 2a. The retorts 1 are closed in an at least virtually gastight fashion by means of a cover 11. In this plant, there is a first feed direction by means of which the retorts 1, as indicated by the arrows A, are inserted into a reactor 3 incorporated into the plant. In the reactor 3, there are four reactor chambers 31, 31a, 31b, 31c into which retorts 1 containing biogenous source material 2 are consecutively introduced. In addition, a combustion chamber 4 is provided, to which lines 41 lead from the retorts 1 through which the pyrolysis gases produced in the retorts 1 are supplied to the combustion chamber 4. In the combustion chamber 4, the pyrolysis gases are burned by means of a main burner 42 contained therein, with the addition of air. There is also an auxiliary burner 43 in the combustion chamber 4. The combustion chamber 4 is connected to the reactor chambers 31, 31a, 31b, 31c by means of lines 44 via which they are supplied with hot flue gases generated in the combustion chamber 4 at a temperature of approximately 600° C. to 800° C.

By means of the hot flue gases, a pyrolysis in the biogenous source material 2 contained in the retorts 1 is initiated, by means of which pyrolysis gases are produced, which have a temperature of 300° C. to 600° C. In addition, the reactor chambers 31, 31a, 31b, 31c are connected to lines 45 through which flue gases that have been cooled to approximately 350° C. to 600° C. are conducted away.

The auxiliary burner 43 in the combustion chamber 4 is used during the initiation of the process to generate the flue gases that are required for the beginning of the pyrolysis in the retorts 1. The hot flue gases supplied via the lines 44 are then used to initiate, assist, and control the pyrolysis.

In the lines 45 and 44, regulating devices 46 are provided for controlling the volume of the flue gases flowing into and out of the reactor chambers 31, 31a, 31b, 31c. In addition, the line 44 through which the hot gases flowing from the combustion chamber 4 to the reactor chambers 31, 31a, 31b, 31c has a line 47 branching off from it, which leads to a first heat exchanger 5. The outlet of this heat exchanger 5 is connected to a second heat exchanger 5a. The second heat exchanger 5a is also connected to the lines 45 via which the cooled flue gases reactor chambers 31, 31a, 31b, 31c flow out.

By means of the heat exchangers 5, 5a, excess thermal energy is conveyed away and utilized. The heat exchanger 5a is connected to a dust-removal system 6 whose outlet is connected via a line 6 containing a fan 62 to a flue 63. The line 61 is also connected to a line 64, which contains a fan 65 and which is connected to a mixing device 48 contained in the line 44. The mixing of cooled flue gases to the flue gases that are supplied via the lines 44 to the reactor chambers 31, 31a, 31b, 31c is used to control the heat supply to the retorts 1 contained in the reactor chambers 31, 31a, 31b, 31c, by means of which in combination with the control devices 46, the sequence of the pyrolysis processes can be controlled.

By means of a second delivery unit, as is indicated by the arrows B, the retorts 1 in which the pyrolysis has been completed and which contain the resulting biochar 2a are removed from the reactor chambers 31, 31a, 31b, 31c and then cooled. The cooling in this case can take place naturally or by means of forced air convection. The resulting thermal energy can be conveyed away and supplied for another use. After the cooling, the retorts are opened and the biochar 2a is conveyed away.

Figure 1A:
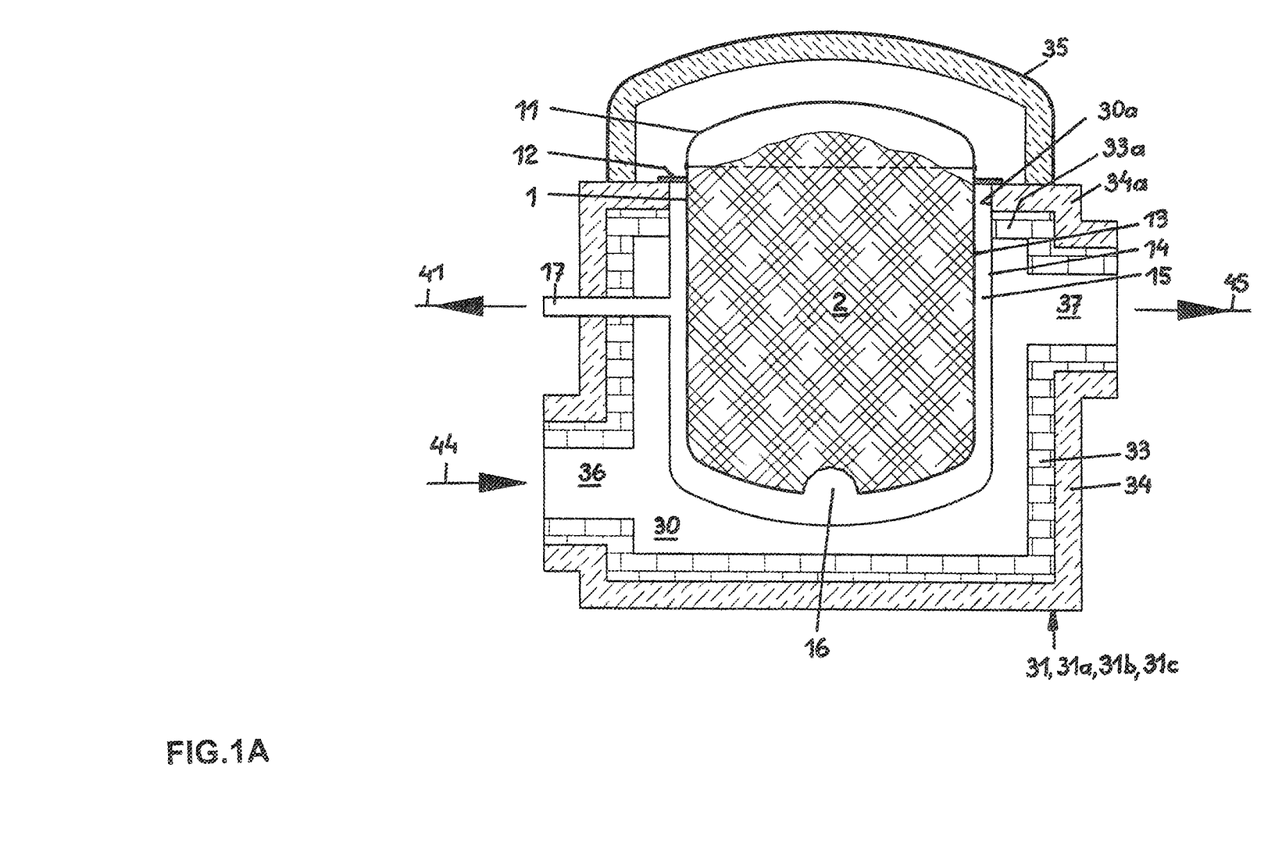
FIG. 1A shows a reactor chamber with a retort, which is used in a plant according to FIG. 1, in a sectional depiction that is enlarged and more detailed in comparison to FIG. 1, and FIG. 2 schematically depicts an embodiment of a plant for carrying out the process according to the invention that has been modified relative to the embodiment according to FIG. 1.

The embodiment of a retort 1 that contains biogenous source material 2 will be explained below based on FIG. 1A and its placement in a reactor chamber 31, 31a, 31b, 31c:

The reactor chambers 31, 31a, 31b, 31c are embodied with temperature-resistant walls 33, which are provided with an outer insulation 34 and which enclose a reactor space 30. At the top is a top wall 33a, 34a that is embodied with an opening 30a through which a retort 1 can be inserted into the reactor space 30. Over it there is a cap 35 placed on it in a gastight fashion, which consists of sheet steel and insulation, for example. The retort 1 is embodied with a cylindrical outer wall 13 that has an annular flange 12, which at its rim comes into contact with the top wall 33a, 34a, by means of which the retort 1 is held in the reactor chambers 31, 31a, 31b, 31c and the reactor space 30 is closed in a virtually gastight fashion. In the reactor chambers 31, 31a, 31b, 31c, there is a cylindrical separating wall 14, which encloses the cylindrical outer wall 13 of the retort 1, thus forming an annular space 15 between the two walls 13 and 14, which is sealed in a virtually gastight fashion relative to the reactor space 30. In the region of the bottom, the retort 1 is provided with an opening 16 containing a grating that holds the source material 2 in the retort 1. The annular space 15 is adjoined by a pipe fitting 17, which extends through the wall 33, 34 of the reactor chambers 31, 31a, 31b, 31c and to which the line 41 leading to the combustion chamber 4 is connected. The reactor chamber 31, 31a, 31b, 31c is also connected to the supply line of hot flue gases via the line 44 from the combustion chamber 4 and is embodied with an outlet opening 37 for conveying out cooled flue gases via the line 45.

Such a retort 1 has, for example, a holding space of approximately 3 holding space of approximately 3 m³ in which biogenous source material 2 with a weight of approximately 1000 kg can be loaded. The retort 1 itself, which is made of steel, has a weight of approximately 650 kg. The quantity of wood char 2a produced by the pyrolysis is approximately 1.5 m³ with a weight of approximately 350 kg. Because of the large content of the retorts, the granulation size of the source materials is only of minor importance.

The pyrolysis process is carried out as follows:

A retort 1 that contains biogenous source material 2 for the production of biochar 2a is inserted by means of a conveyor device in the direction of the arrows A into one of the reactor chambers 31, 31a, 31b, 31c. The reactor space 30 of the reactor chambers 31, 31a, 31b, 31c here is sealed to prevent the escape of gases by the retorts 1 that are inserted into them. Then, the relevant reactor chambers 31, 31a, 31b, 31c are supplied with hot flue gases at a temperature of 600° C. to 800° C. from the combustion chamber 4 via the line 44, which flow into the reactor space 30 through the inlet opening 36. This heats the pyrolysis gas in the annular space 15 and heats the outer wall 13 of the retort 1, which pyrolyzes the biogenous material 2 contained in the retort 1. Then another retort 1 is inserted into one of the other reactor chambers 31, 31a, 31b, 31c and pyrolysis is likewise initiated therein. Then retorts 1 are consecutively inserted into other reactor chambers 31, 31a, 31b, 31c. In all of these retorts 1, which contain biogenous source material 2, a pyrolysis takes place; the pyrolysis processes taking place in the individual retorts 1 are each in different stages. As soon as the pyrolysis has been completed in the first retort 1, this retort 1 is removed from the relevant reactor chamber and another retort 1 containing biogenous source material 2 is inserted in its place. Then a pyrolysis is initiated in this retort 1 as well. As the process continues, each of the retorts 1 in which the pyrolysis has been completed is removed from the reactor chambers 31, 31a, 31b, 31c and other retorts 1 in which biochar 2a is to be produced are inserted.

The pyrolysis gases that are produced by this, which have a have a temperature of 300° C. to 600° C., flow through the opening 16 in the bottom wall of the retort 1 into the annular chamber 15 and then travel through the pipe fitting 17 into the line 41, which leads to the combustion chamber 4 in which they are burned by means of the main burner 42.

The flue gases flowing into the reactor space 30 through the inlet opening 36 are cooled in the reactor space 30 and flow through the outlet opening 37 into the line 45 through which they travel to the second heat exchanger 5a in which the heat contained in them is recovered. Other cooled flue gases exiting from the heat exchanger 5a are cleaned in the dust separating unit 6 and are released into the free atmosphere by means of the fan 62 via the smoke stack 8 and via the line 64 and the mixing device 48, the hot gases from the combustion chamber 4 are supplied to the reactor chambers 31, 31a, 31b, 31c. Through the mixing of the flue gases flowing from the combustion chamber 4 to the reactor 3 with cooled flue gases, a control of the pyrolysis processes in the retorts 1 is carried out like the one carried out by the control devices 46.

The flue gases that are required to initiate the pyrolysis when starting up the plant are produced by the auxiliary burner 17. Only a small percentage of the flue gases produced by the combustion chamber 4 is used for the pyrolysis procedures. The overwhelming percentage of the flue gases produced by the combustion chamber 4 is conveyed via the line 47 to the heat exchanger 5; the resulting thermal energy is used outside the plant, among other things for heating units and/or for generating electricity.

Figure 2:
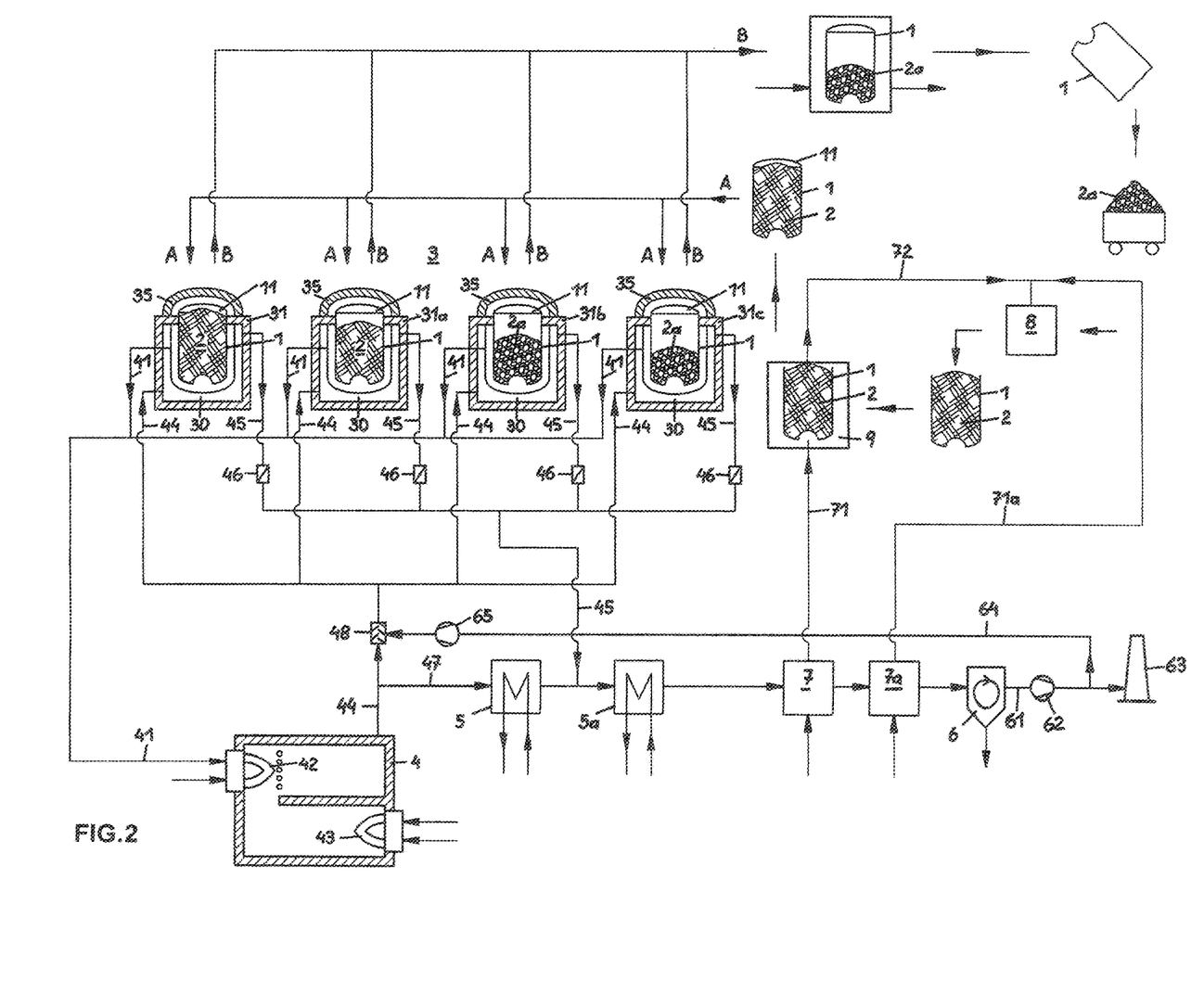

The plant shown in FIG. 2 differs from the plant shown in FIG. 1 in that two air preheaters 7 and 7a are connected to the heat exchanger 5a. A line 71a leads from the air preheater 7a to a device 8 in which the biogenous source material 2 contained in a retort 1 is dried. A line 71 leads from the air preheater 7 to a device 9 in which the biogenous source material 2 contained in a retort 1 is preheated for the pyrolysis. The hot air exiting from the preheating unit 9 is supplied via a line 72 to the drying unit 8. Because of the predrying of the source materials, they can have a water content of up to 50% by weight of the fresh substance. The retorts 1 containing the dried and preheated biogenous source material 2 are consecutively conveyed by the first conveyor in the direction of the arrows A into the reactor 3.

The decisive factors for this process are the following circumstances:

Only the pyrolysis of the biogenous source material 2 is carried out in the reactor chambers 31, 31a, 31b, 31c. By contrast, the drying and the preheating of the source materials 2 and the cooling of the biochar 2a produced takes place outside the reactor chambers 31, 31a, 31b, 31c. The flue gases that are required to initiate and control the pyrolysis are only supplied to a separating wall 14 situated outside the outer wall 13 of the retort 1. As a result, the pyrolysis gases flowing in the annular space 15 situated between the separating wall 14 and the outer wall 13 of the retort 1 are heated as is the outer wall 13 of the retort. This prevents the flue gases from becoming encumbered with components of the source materials that are in different stages of pyrolysis, which would then have to be separated out and also avoids an unwanted oxidation of the source materials. This also heats the pyrolysis gases to a higher temperature, thus preventing tars from condensing out.

Because the pyrolysis processes taking place in the individual retorts are chronologically offset from one another, a continuous flow of pyrolysis gases and a continuous flow of flue gases is achieved, as a result of which the operation of the entire plant occurs in a semi-continuous fashion.

This process sequence achieves an efficient and very low-emission production of biochar with a high degree of flexibility of the material used and a good ability to track individual product batches.

The biogenous source material 2 contained in the retorts 1, because the retorts 1 are contained in the individual reactor chambers 31, 31a, 31b, 31c, can therefore undergo individually controlled pyrolysis processes, making it possible to adjust to specific requirements of the biochar 2a produced and a good ability to track individual batches of the product is achieved. Through the use of at least one heat exchanger and/or the recirculation of the significantly cooled pyrolysis gases coming from it to the hot gas flow achieves an optimal energy efficiency. It is thus possible to convert up to 85% of the thermal power of the source material into usable energy in the form of biochar, thermal energy, and electrical current.

The pyrolysis processes take place in batches in the retorts 1, thus enabling a heating, pyrolysis, and cooling of biogenous source materials with minimal particle abrasion and with low dust emissions.

The process according to the invention therefore achieves the following advantages:

low dust emissions due to the minimization of material movements within the retorts and because of the indirect heating of the source materials;

continuous operation through a chronological staggering of the pyrolysis processes taking place in the individual retorts, thus achieving a continuous production of pyrolysis gases and flue gases;

good ability to track the pyrolysis processes of individual batches, thus ensuring achievement of defined degrees of quality of the biochar produced;

high flexibility in the use of the source materials with low requirements as to the type, granulation, and water content of the source materials;

low gaseous emissions by the direct combustion of pyrolysis gases;

low costs due to a simple process sequence and a high degree of possible automation;

achievement of high energetic efficiencies due to extensive utilization of the resulting process heat for heating and electricity production.

REFERENCE NUMERAL LIST

A conveying by means of a first conveyor
B conveying by means of a second conveyor
1 retorts
11 cover
12 annular flange
13 outer wall of the retorts
14 separating wall
15 annular space
16 bottom opening
17 pipe fitting
2 biogenous source material
2a biochar
3 reactor
30 reactor space
30a opening
31, 31a,
31b, 31c reactor chambers
33 brick wall
33a top wall
34 insulation
34a insulation
35 cap
36 inlet opening for hot gases
37 outlet opening for hot gases
4 combustion chamber
41 lines for the pyrolysis gases
42 main burner
43 auxiliary burner
44 lines to the reactor chambers
48 mixing device
5, 5a heat exchanger
6 dust separating unit
61 line
62 fan
63 smoke stack
64 line to mixing device
65 fan
7 air preheater for preheating
7a air preheater for drying
71 line to the preheating unit
71a line to the drying unit
8 drying unit
9 preheating unit

The invention claimed is:
1. A process for producing biochar comprising:
pyrolyzing biogenous source material (2) contained in a plurality of retorts (1), wherein the pyrolyzing is per- formed in a plurality of reactor chambers (31, 31*a*, 31*b*, 31*c*), and wherein combustible pyrolysis gases are formed, burning the combustible pyrolysis gases formed by the pyrolyzing, wherein the burning is in a combustion chamber (4), generating from the burning hot flue gases, wherein the pyrolyzing occurs by introducing the retorts (1) consecutively into the plurality of reactor chambers (31, 31*a*, 31*b*, 31*c*), wherein and the pyrolyzing is performed in the plurality of reactor chambers by means of the flue gases conveyed into the plurality of reactor chambers (31, 31*a*, 31*b*, 31*c*), wherein the retorts (1) are sealed to prevent the entry of hot flue gases, wherein the heating of the source material (2) contained in the retorts (1) takes place only indirectly by means of the flue gases through the heating of the retorts (1) through a separating wall (14), wherein a space surrounding the respective retort (1) is an annular space (15) between the separating wall (14) and an outer wall (13) of the retort (1), wherein the pyrolysis gases are conveyed through the annular space (15) to the combustion chamber (4), and wherein exiting pyrolysis gases from the retort and the outer wall (13) of the retort (1) are heated by the flue gases.

2. The process according to claim 1, wherein hot flue gases flowing into at least one reactor chamber of the plurality of rector chambers(31, 31*a*, 31*b*, 31*c*), and cooled flue gases flowing out of the at least one reactor chamber, and the pyrolysis gases that are produced by the pyrolyzing and which flow out of the at least one reactor chamber (31, 31*a*, 31*b*, 31*c*), are kept in regions in the plurality of reactor chambers (31, 31*a*, 31*b*, 31*c*) that are separated from each other by means of the separating wall (14) therein.

3. The process according to claim 1, wherein part of the flue gases is conveyed into at least one reactor chamber of the plurality of reactor chambers (31, 31*a*, 31*b*, 31*c*) and part is conveyed to at least one heat exchanger (5, 5*a*).

4. The process according to claim 1, wherein the currents of the flue gases in supply lines (44) of the flue gases to at least one reactor chamber of the plurality of reactor chambers (31, 31*a*, 31*b*, 31*c*) and/or in outlet lines (45) of cooled flue gases from the at least one reactor chamber (31, 31*a*, 31*b*, 31*c*) are controlled by means of regulating devices (46).

5. The process according to claim 1, wherein cooled flue gases flowing out of at least one reactor chamber of the plurality of reactor chambers (31, 31*a*, 31*b*, 31*c*) are partially supplied to the flue gases that are generated in the combustion chamber (4) and that flow to the at least one reactor chamber (31, 31*a*, 31*b*, 31*c*), thus controlling the temperature of the pyrolyzing taking place in the retorts (1).

6. The process according to claim 1, wherein cooled flue gases flowing out of at least one reactor chamber of the plurality of reactor chambers (31, 31*a*, 31*b*, 31*c*) are supplied to at least one heat exchanger (5, 5*a*) for recovery of residual heat.

7. The process according to claim 6, wherein residual heat recovered by means of the at least one heat exchanger (5, 5*a*) is used for drying and/or for preheating the biogenous source material (2).

8. The process according to claim 1, wherein thermal energy recovered in a cooling of the biochar (2*a*) is supplied outside a plant in which the process for producing biochar takes place for heating units and/or for generating electricity.

9. The process according to claim 1, wherein the individual retorts (1) are consecutively introduced into the at least one reactor chamber (31, 31*a*, 31*b*, 31*c*) and the biogenous source material (2) contained in the retorts (1) is consecutively pyrolyzed, thus continuously generating pyrolysis gases, by means of which flue gases are produced, which are used to assist and/or control the pyrolyzing taking place in the retorts (1).

10. The process according to claim 9, wherein at least a first retort (1) in which the pyrolysis has been completed is removed from a reactor chamber (31, 31*a*, 31*b*, 31*c*) and the biochar (2*a*) contained in this retort (1) is removed from the retort (1), wherein in at least one second retort (1) that is contained in a reactor chamber (31, 31*a*, 31*b*, 31*c*), the source material (2) contained therein is pyrolyzed, and wherein at least one third retort (1) is introduced into a reactor chamber (31, 31*a*, 31*b*, 31*c*) and the pyrolysis of the biogenous source material (2) contained therein is initiated.

11. A plant for carrying out the process according to claim 1, wherein at least one reactor chamber from the plurality of reactor chambers (31, 31*a*, 31*b*, 31*c*) is provided, which is embodied with a reactor space (30) for accommodating at least one retort (1), the at least one reactor chamber (31, 31*a*, 31*b*, 31*c*) having an inlet opening (36) for the flue gases into the reactor space (30) and an outlet opening (37) for cooled flue gases, with the separating wall (14) between the retort (1) and the inlet opening (36) and the outlet opening (37) for the flue gases respectively, wherein a line (17) is connected to the annular space (15) in which the pyrolysis gases exiting from the retort (1) into the annular space (15) are conveyed to the combustion chamber (4).

12. The plant according to claim 11, wherein the at least one reactor chamber (31, 31*a*, 31*b*, 31*c*) is embodied with a gastight cover (35).

13. The plant according to claim 11, wherein a top wall (33*a*, 34*a*) of the at least one reactor chamber (31, 31*a*, 31*b*, 31*c*) is provided with an opening (30*a*) through which a retort (1) is inserted into the reactor chamber (31, 31*a*, 31*b*, 31*c*) and wherein the retort (1) is embodied with a laterally protruding flange (12), which rests against the rim of the opening (30*a*).

14. The plant according to claim 13, wherein the reactor space (30) of the at least one reactor chamber (31, 31*a*, 31*b*, 31*c*) is closed in a gastight fashion by means of a retort (1) that is inserted into it.

15. The plant according to claim 11, wherein in a line (44) for the flue gases leading from the combustion chamber (4) to the at least one reactor chamber (31, 31*a*, 31*b*, 31*c*) a mixing device (48) is provided, which is able to mix the flue gases flowing from the combustion chamber (4) to the at least one reactor chamber (31, 31*a*, 31*b*, 31*c*) with cooled flue gases, by which the pyrolyzing taking place in the retorts can be controlled.

16. The plant according to claim 11, wherein in lines (44) in which the flue gases flow from the combustion chamber (4) to the at least one reactor chamber (31, 31*a*, 31*b*, 31*c*) and/or in lines (45) in which the cooled flue gases flow out of the at least one reactor chamber (31, 31*a*, 31*b*, 31*c*), devices (46) are provided for controlling the flue gases flowing in these lines (44, 45).

17. The plant according to claim 11, wherein a line (44) for the flue gases flowing out of the combustion chamber (4) is connected to at least one heat exchanger (5, 5*a*) in order to use the thermal energy.

18. The plant according to claim 17, wherein units (8, 9) for drying and/or heating the biogenous source material (2) are connected to the at least one heat exchanger (5, 5*a*).

19. The plant according to claim 11, wherein at least one unit for cooling the resulting biochar (2*a*) is provided, whose thermal discharge is supplied outside the plant for heating units and/or for generating electricity.

* * * * *